United States Patent
Leung et al.

(10) Patent No.: US 7,130,629 B1
(45) Date of Patent: Oct. 31, 2006

(54) ENABLING SERVICES FOR MULTIPLE SESSIONS USING A SINGLE MOBILE NODE

(75) Inventors: Kent K. Leung, Mountain View, CA (US); Gopal Dommety, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/520,601

(22) Filed: Mar. 8, 2000

(51) Int. Cl.
*H04Q 7/20* (2006.01)

(52) U.S. Cl. .............................. 455/435.1; 455/432.1; 455/433; 455/461; 455/432.3; 370/338; 370/328; 370/351; 370/352; 370/354; 370/400; 370/401; 370/460

(58) Field of Classification Search ............ 455/435.1, 455/432.1, 433, 461; 370/338, 351, 352, 370/354, 355, 356, 389, 392, 393, 400, 401, 370/328, 460
See application file for complete search history.

(56) References Cited

U.S. PATENT DOCUMENTS

| | | | |
|---|---|---|---|
| 4,692,918 A | 9/1987 | Elliott et al. .................. 370/85 |
| 5,016,244 A | 5/1991 | Massey et al. ................. 370/16 |
| 5,018,133 A | 5/1991 | Tsukakoshi et al. ... 340/825.05 |
| 5,218,600 A | 6/1993 | Schenkyr et al. .............. 370/16 |
| 5,371,852 A | 12/1994 | Attanasio et al. ........... 395/200 |
| 5,473,599 A | 12/1995 | Li et al. ........................ 370/16 |
| 5,572,528 A | 11/1996 | Shuen | |
| 5,619,552 A | 4/1997 | Karppanen et al. | |
| 5,729,537 A | 3/1998 | Billström | |
| 5,825,759 A | 10/1998 | Liu | |
| 5,862,345 A | 1/1999 | Okanoue et al. | |
| 5,978,672 A * | 11/1999 | Hartmaier et al. .......... 455/413 |
| 6,016,428 A * | 1/2000 | Diachina et al. ......... 455/435.1 |
| 6,055,236 A * | 4/2000 | Nessett et al. .............. 370/389 |
| 6,061,650 A | 5/2000 | Malkin et al. | |
| 6,075,783 A * | 6/2000 | Voit ............................. 370/352 |
| 6,078,575 A | 6/2000 | Dommety et al. | |
| 6,079,020 A | 6/2000 | Liu | |
| 6,081,507 A * | 6/2000 | Chao et al. .................. 370/235 |
| 6,122,268 A * | 9/2000 | Okanoue et al. ............ 370/338 |
| 6,131,095 A * | 10/2000 | Low et al. ..................... 707/10 |
| 6,137,791 A * | 10/2000 | Frid et al. .................... 370/352 |

(Continued)

FOREIGN PATENT DOCUMENTS

EP 0924913 A1 6/1999

(Continued)

OTHER PUBLICATIONS

Release notes for 3Com Corporation, "Conducting a redundant Route for Network Resiliency," Mar. 1994, *NET Builder Family Bridge/Router* pp. 26-29.

(Continued)

*Primary Examiner*—Marceau Milford
(74) *Attorney, Agent, or Firm*—Beyer Weaver & Thomas LLP

(57) ABSTRACT

Methods and apparatus for performing registration on behalf of a session associated with a mobile node are disclosed. The mobile node composes a registration request including a NAI identifying a userID and a sub-NAI that uniquely identifies a session associated with the NAI. The mobile node then sends the registration request. When the Home Agent authenticates the mobile node, the Home Agent returns an IP address associated with the session. The NAI and sub-NAI may then be mapped to this IP address in a mobility binding table associated with the Home Agent as well as a visitor table associated with the Foreign Agent to which the mobile node has roamed.

51 Claims, 8 Drawing Sheets

U.S. PATENT DOCUMENTS

| | | | |
|---|---|---|---|
| 6,144,671 A * | 11/2000 | Perinpanathan et al. | 370/409 |
| 6,154,839 A | 11/2000 | Arrow et al. | |
| 6,173,399 B1 | 1/2001 | Gilbrech | |
| 6,175,917 B1 | 1/2001 | Arrow et al. | |
| 6,195,705 B1 | 2/2001 | Leung | |
| 6,226,748 B1 | 5/2001 | Bots et al. | |
| 6,226,751 B1 | 5/2001 | Arrow et al. | |
| 6,230,012 B1 | 5/2001 | Wilkie et al. | 455/435 |
| 6,272,129 B1 | 8/2001 | Dynarski et al. | 370/356 |
| 6,308,267 B1 | 10/2001 | Gremmelmaier | 713/168 |
| 6,339,830 B1 | 1/2002 | See et al. | 713/202 |
| 6,393,482 B1 | 5/2002 | Rai et al. | |
| 6,396,828 B1 | 5/2002 | Liu | 370/352 |
| 6,445,922 B1 * | 9/2002 | Hiller et al. | 455/433 |
| 6,452,920 B1 | 9/2002 | Comstock | |
| 6,466,964 B1 | 10/2002 | Leung et al. | 709/202 |
| 6,473,413 B1 | 10/2002 | Chiou et al. | 370/331 |
| 6,496,491 B1 | 12/2002 | Chuah et al. | |
| 6,496,855 B1 | 12/2002 | Hunt et al. | 709/217 |
| 6,522,880 B1 * | 2/2003 | Verma et al. | 455/436 |
| 6,535,493 B1 | 3/2003 | Lee et al. | 370/329 |
| 6,571,289 B1 | 5/2003 | Montenegro | |
| 6,577,643 B1 | 6/2003 | Rai et al. | 370/466 |
| 6,578,085 B1 | 6/2003 | Khalil et al. | 709/241 |
| 6,587,882 B1 | 7/2003 | Inoue et al. | 709/227 |
| 6,625,135 B1 | 9/2003 | Johnson et al. | 370/332 |
| 6,651,105 B1 | 11/2003 | Bhagwat et al. | 709/239 |
| 6,665,537 B1 | 12/2003 | Lioy | 455/435.1 |
| 6,683,871 B1 * | 1/2004 | Lee et al. | 370/356 |
| 6,701,437 B1 | 3/2004 | Hoke et al. | |
| 6,707,809 B1 | 3/2004 | Warrier et al. | |
| 6,742,036 B1 | 5/2004 | Das et al. | 709/226 |
| 6,760,444 B1 | 7/2004 | Leung | 380/270 |
| 6,795,857 B1 | 9/2004 | Leung et al. | 709/224 |
| 2002/0026527 A1 | 2/2002 | Das et al. | 709/245 |
| 2002/0147837 A1 | 10/2002 | Heller | |
| 2004/0024901 A1 | 2/2004 | Agrawal et al. | 709/238 |

FOREIGN PATENT DOCUMENTS

| | | |
|---|---|---|
| EP | 0978977 A1 | 2/2000 |
| EP | 1124396 A2 | 8/2001 |

OTHER PUBLICATIONS

Uyless Black, "*TCP/IP and Related Protocols*," 1992, McGraw-Hill, Inc., pp. 226-249.

T. Li, et al., RFC 2281 "*Cisco Hot Standby Router Protocol (HSRP)*," Mar. 1998.

Chambless, et al., "*Home Agent Redundancy Protocol (HARP)*," Oct. 27, 1997.

Network Working Group, RFC 2002 "*IP Mobility Support*", Oct. 1996.

C. Perkins, "*IP Mobility Support*," RFC2002, IBM Corporation, Oct. 1996.

"*Mobile IP*," Release 12.0(1)T, pp. 1-55.

Montenegro, G., "*Reverse Tunneling for Mobile IP*," RFC 2344, Sun Microsystems, Inc., pp. 1-19, May 1998.

D. Harkins and D. Carrel, "*The Internet Key Exchange (IKE)*," Cisco Systems, pp. 1-33, Jun. 1998.

D. Cong and M. Hamlen, and C. Perkins, "*The Definitions of Managed Objects for IP Mobility Support using SMIv2*," RFC2006, Motorola and IBM, pp. 1-52, Oct. 1996.

Aboda and Breadles, "*The Network Access Identifer*" RFC 2486, Jan. 1999.

Calhoun and Perkins, "*Mobile IP Network Access Identifier Extension* ", Jan. 12, 2000.

Postel, J., "*Simple Mail Transfer Protocol*", STD 10, RFC821, Aug. 1982.

Crocker, D. and P. Overrell, "*Augmented BNF For Syntax Specifications: ABNF*", RFC 2234, Nov. 1997.

R. Droms, "*Dynamic Host Configuration Protocol*", RFC 2131, Mar. 1997, pp. 1-39.

J. Moy, "*OSPF Version 2*", RFC 1247, Jul. 19, 1991.

D. Oran, "*OSI-IS-IS Intra-domain Routing Protocol*", RFC 1142, Feb. 1990.

Helmy et al., "*Efficient Micro-Mobility using Intra-Domain Multicast-Based Mechanism (M&M)*", ACM SIGCOMM Computer Communications Review, vol. 32, No. 5: Nov. 2002, pp. 61-72, XP-002279254.

C. Finseth, "*An Access Control Protocol, Sometimes Called TACACS*", RFC 1492, pp. 1-15, Sep. 13, 1992.

D. Carrel and Lol Grant, "*The TACACS+ Protocol*", Network Working Group, Internet-Draft, Cisco Systems, pp. 1-42, Jan. 1997.

C. Rigney, "*RADIUS Accounting*", RFC 2139, Livington, pp. 1-25, Apr. 1997.

C. Rigney, et al., "*Remote Authentication Dial in User Service (RADIUS)*", RFC 2138, pp. 1-65, Apr. 1997.

Perkins & Hobby, "*The Point-to-Point Protocol (PPP) Initial Configuration Options*," Network Working Group, RFC 1172 Jul. 1990.

W. Simpson, *PPP Challenge Handshake Authentication Protocol (CHAP)*. Network Working Group, RFC 1994 Aug. 1996.

Lloyd, et al., "*PPP Authentication Protocols*", Network Working Group, RFC 1334, Oct. 1992.

McGregor, "*The PPP Internet Protocol Control Protocol (IPCP)*" Network Working Group, RFC 1332, May 1992.

Simpson, ed., "*The Point-to-Point Protocol (PPP)*" Network Working Group, RFC 1661, Jul. 1994.

International Search Report PCT/US 03/38568, 4 pp., mailed May 21, 2004.

International Search Report PCT/US2004/013365, 7 pp., mailed Oct. 5, 2004.

\* cited by examiner

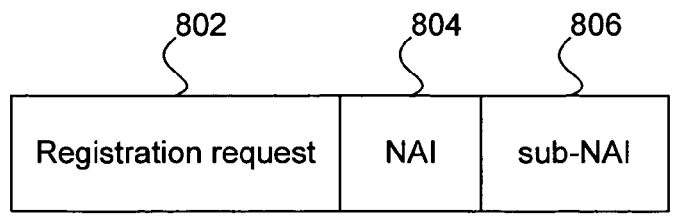
FIG. 8
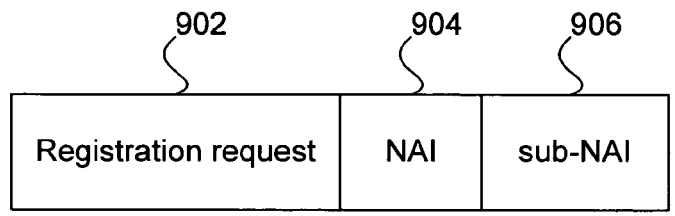
FIG. 9
Mobility Binding Table
| NAI | sub-NAI | session IP address | care-of address | Tunnel |
|---|---|---|---|---|
| 1002 | 1004 | 1006 | 1008 | 1010 |
FIG. 10
Visitor Table
| NAI | sub-NAI | session IP address | Home Agent IP address | Interface-Tunnel to HA |
|---|---|---|---|---|
| 1102 | 1104 | 1106 | 1108 | 1110 |
FIG. 11

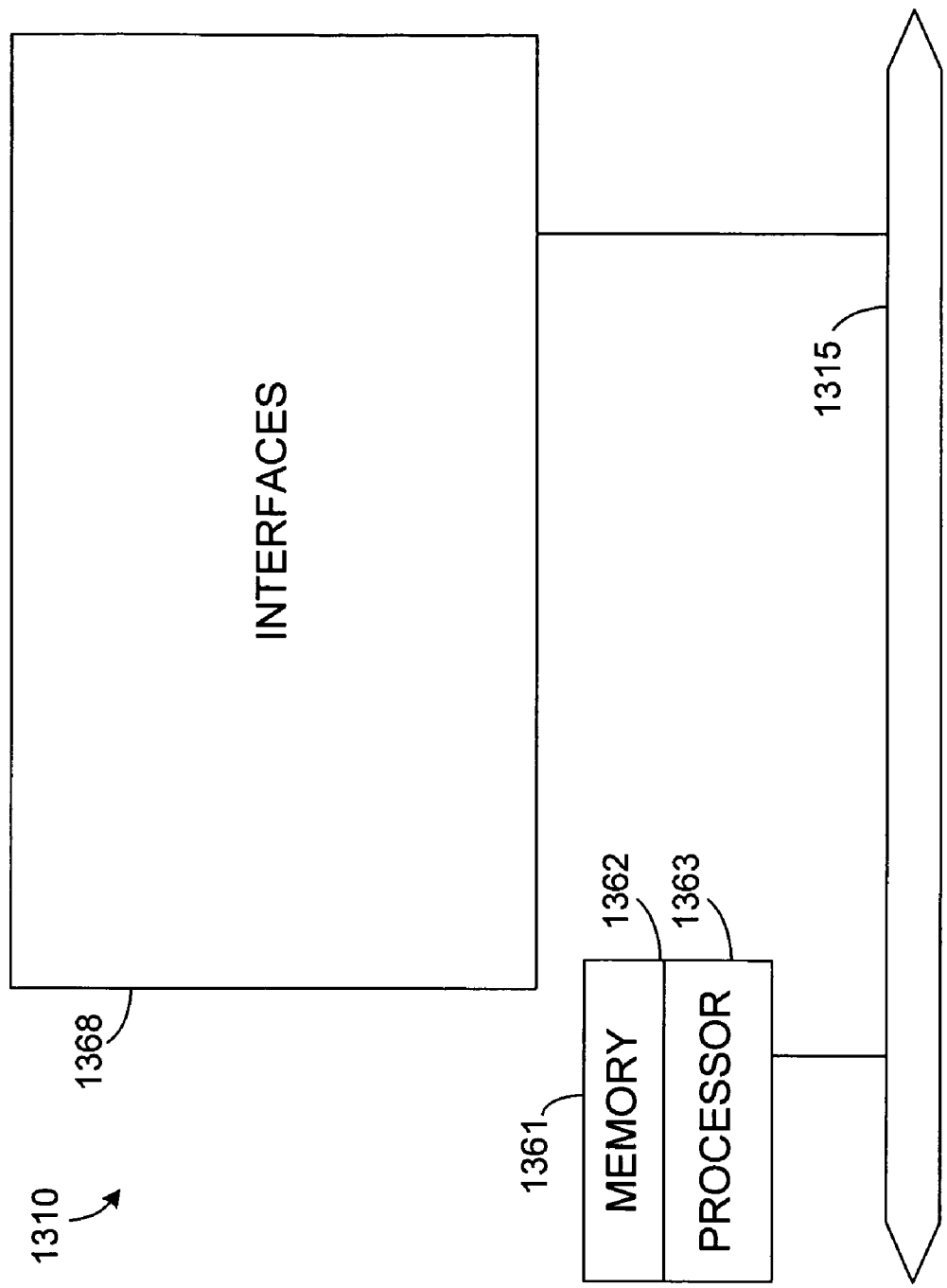

ENABLING SERVICES FOR MULTIPLE SESSIONS USING A SINGLE MOBILE NODE

BACKGROUND OF THE INVENTION

1. Field of the Invention

The present invention relates to Mobile IP network technology. More particularly, the present invention relates to enabling multiple sessions or services for separate devices or applications associated with a single mobile node.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

As described above, the mobile node's IP address (i.e., Home Address) is typically used to identify the mobile node. Thus, when messages are sent to a mobile node, they are sent to that mobile node's IP address. However, in order to enhance the interoperability of roaming and tunneling services, it is desirable to have a standardized method for identifying users. Such a standardized method is proposed in RFC 2486 of the Network Working Group, January 1999, which proposes syntax for the Network Access Identifier (NAI), the userID submitted by a client during Point to Point Protocol (PPP) authentication. Thus, when a client is authenticated based upon the NAI, an IP address may be allocated for use by the client.

When a client is static within a single network, an IP address may be assigned in most cases based solely on the NAI. In addition, as described in Internet Draft "http://search.ietf.org/internet-drafts/draft-ietf-mobileipi-mn-nai-07.txt," submitted by the Mobile IP Working Group, Jan. 12, 2000, it has been proposed that the NAI be used to identify a mobile node in order for an IP address (i.e., Home Address) to be assigned. However, this technique is inappropriate in those instances when the client is a mobile node that wishes to roam among different networks. More particularly, when an IP address is assigned by a network access server (NAS), this IP address is assigned based upon the dial in port from a pool of addresses associated with a particular network and therefore the assigned IP address cannot be used within the additional networks to which the mobile node roams. In addition, since the IP address is mapped to the NAI, a problem occurs when more than one node or application wishes to roam using the same mobile node 6 and therefore the same NAI. In other words, when multiple nodes or applications are authenticated based upon the same NAI, a single IP address will be allocated for two different sessions (e.g., devices or applications). Accordingly, mobility cannot be enabled in two different devices or applications based upon the same NAI.

In view of the above, it would be desirable if a mechanism for enabling services to multiple sessions (e.g., devices or applications) via a single or multiple mobile nodes could be established. Moreover, it would be preferable if the sessions could be authenticated using the NAI associated with the mobile node through which the sessions are enabled.

SUMMARY OF THE INVENTION

Methods and apparatus for performing registration on behalf of a session associated with a mobile node are disclosed. A session may be an application (e.g., running on the mobile node) as well as a device that is separate from the mobile node. More particularly, the device need not support Mobile IP. Accordingly, through the present invention, the mobile node may perform a proxy registration on behalf of one or more associated sessions.

In accordance with one aspect of the invention, the mobile node composes a registration request including a NAI identifying a userID (e.g., submitted during PPP authentication) and a sub-NAI that uniquely identifies a session associated with the NAI. For instance, the NAI and sub-NAI may be appended to the registration request in separate extensions to the registration request. The mobile node then sends the registration request to the Home Agent.

In accordance with another aspect of the invention, when the Home Agent authenticates the mobile node based upon information in the registration request, the Home Agent composes and sends a registration reply. In the registration reply, the Home Agent returns an IP address associated with the session. As one example, the IP address may be obtained from the Home Address field of the registration request. As another example, the IP address may be obtained from an entry in a mobility binding table associated with the Home Agent. In addition, the Home Agent may map this IP address to the NAI and sub-NAI in a mobility binding table associated with the Home Agent. Thus, the Home Agent may subsequently use the mobility binding table to route packets addressed to this session via the IP address.

In accordance with yet another aspect of the invention, when the registration reply is received by a Foreign Agent to which the mobile node has roamed, the Foreign Agent may update its visitor table to associate the NAI and sub-NAI with the IP address assigned to that session. In this manner, the Foreign Agent may identify those sessions that are visiting the Foreign Agent.

The present invention enables multiple sessions to be enabled via a single or multiple mobile nodes. This is accomplished through the use of a NAI associated with the mobile node and a sub-NAI that uniquely identifies a session associated with the NAI. Accordingly, multiple Mobile IP sessions may be enabled simultaneously via a single mobile node.

BRIEF DESCRIPTION OF THE DRAWINGS

FIG. 8 is a diagram illustrating an exemplary registration request that may be sent by a mobile node in accordance with an embodiment of the invention.

FIG. 9 is a diagram illustrating an exemplary registration reply that may be sent by a Home Agent in accordance with an embodiment of the invention.

FIG. 10 is a diagram illustrating an exemplary mobility binding table that may be used by an active Home Agent in accordance with an embodiment of the invention.

FIG. 11 is a diagram illustrating an exemplary visitor table that may be used by an active Foreign Agent in accordance with an embodiment of the invention.

FIG. 12 is a block diagram of a network device that may be configured to implement aspects of the present invention.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

As described above, it would be desirable to enable multiple sessions via a single mobile node. A simple solution is to provide a unique NAI for each session. Thus, mobility may be enabled in multiple sessions (e.g., devices or applications) if a user simply specifies a unique NAI when registering via a mobile node. Since the Home Agent associated with the mobile node views the two NAIs as unique, the Home Agent provides different IP addresses. However, this solution is undesirable, since it requires a static mapping of the mobile node 6 to the separate devices or applications. As a result, the user's ability to use new devices with the mobile node 6 would be limited.

Through the use of the present invention, mobility may be enabled by a mobile node on behalf of multiple sessions without requiring a static mapping of the mobile node to the separate devices or applications. Registration is performed on behalf of the sessions by the mobile node through the specification of an NAI associated with the mobile node and a sub-NAI (i.e., session identifier) associated with the session. The session identifier need only be unique within the NAI, and therefore is referred to in the following description as a sub-NAI.

Figure 1:
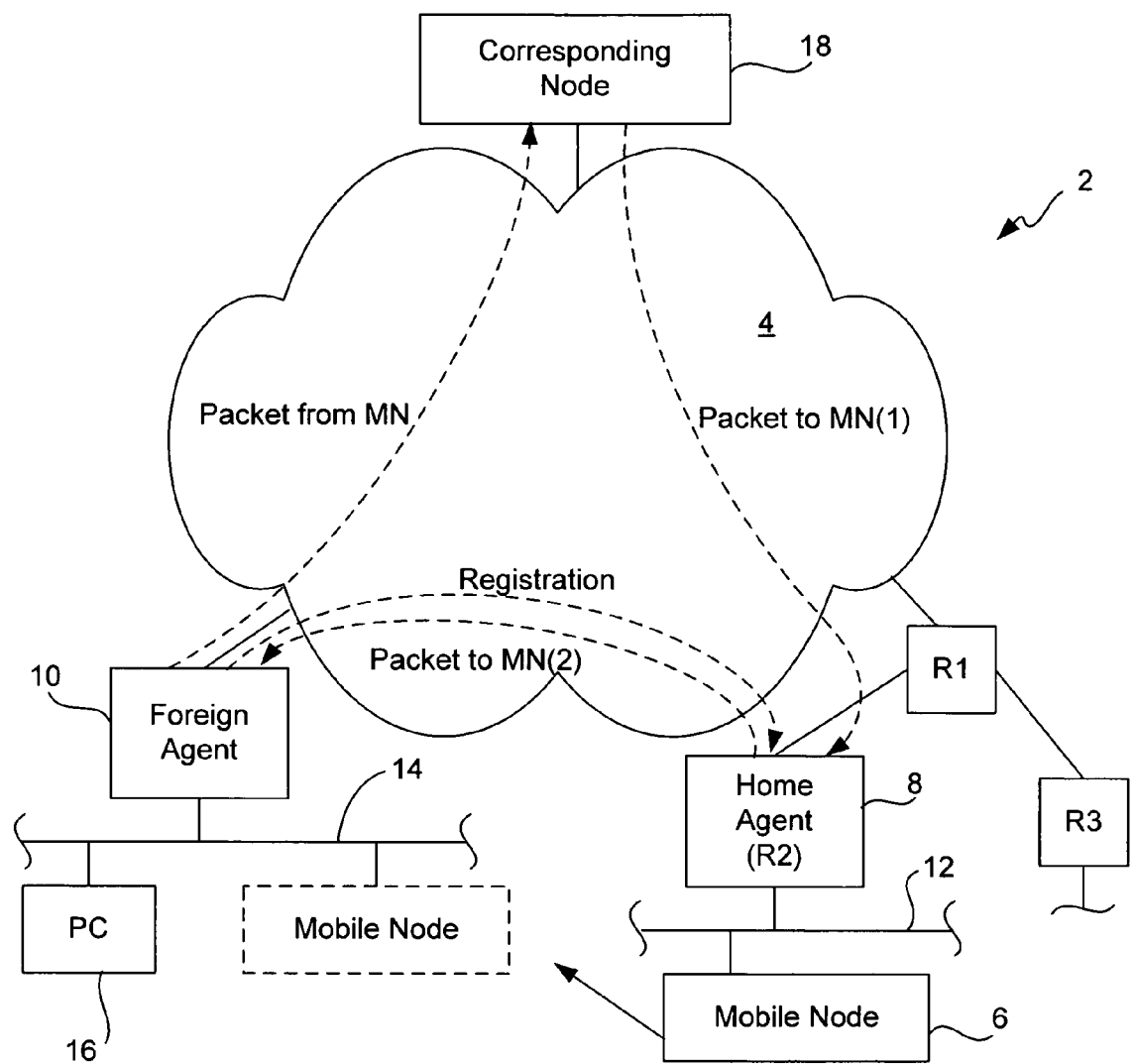
FIG. 1 is a diagram of a Mobile IP network segment and associated environment.
Figure 2:
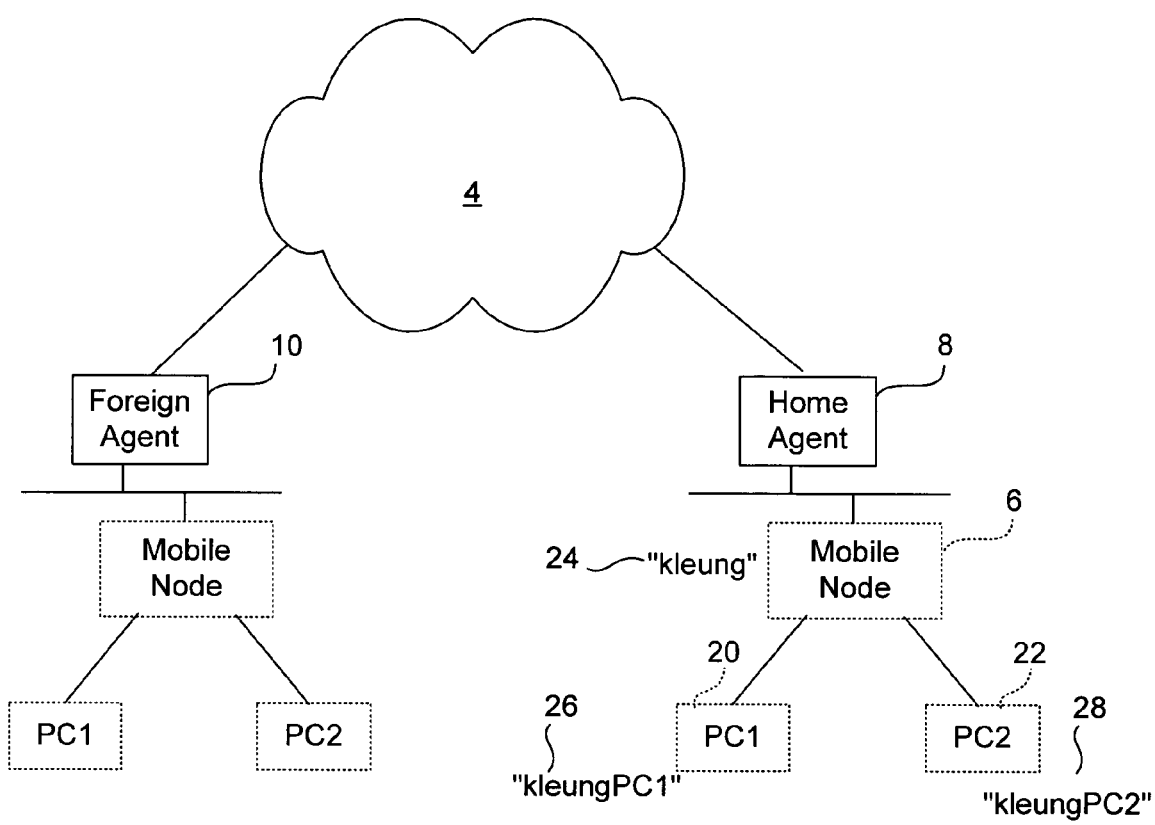
FIG. 2 is a block diagram illustrating a Mobile IP network segment and associated environment in which multiple sessions may be enabled through a single mobile node.

As shown in FIG. 2, it may be desirable to enable two different sessions to be authenticated based upon the same NAI associated with a single mobile node 6. For instance, the NAI may be an e-mail address or a userId submitted in an application layer authentication. The mobile node 6 may be, for example, a phone that supports Mobile IP. Two different users traveling, for instance, in a car or plane, may each wish to connect a laptop to the phone so that each user may separately communicate remotely over the internet via mediation by a Home Agent and a Foreign Agent. For instance, a first user may connect a first laptop (PC1) 20 to the mobile node 6 while a second user may simultaneously connect a second laptop (PC2) 22 to the same mobile node 6. A NAI 24 ("Kleung") associated with the mobile node 6 is submitted in the registration request in order to authenticate the mobile node 6. However, an IP address returned by the Home Agent 8 based upon this authentication will be identical for both users since the NAI 24 is not unique for each session. As a result, the present invention associates a session identifier (i.e., sub-NAI) with each session (e.g., laptop). As shown, a first sub-NAI 26, "KleungPC1," is associated with the first laptop 20 and a second sub-NAI 28, "KleungPC2," is associated with the second laptop 22. Although the sub-NAIs are shown to be strings, the sub-NAI may be implemented in a variety of formats. An IP address may then be allocated by the Home Agent 8 based upon the NAI and associated sub-NAI for the particular session. The IP address may thereafter be used by that session in subsequent communications with a corresponding node. This permits corresponding nodes to continue using the same IP address to communicate with a device or application associated with the mobile node during a given session.

Figure 3:
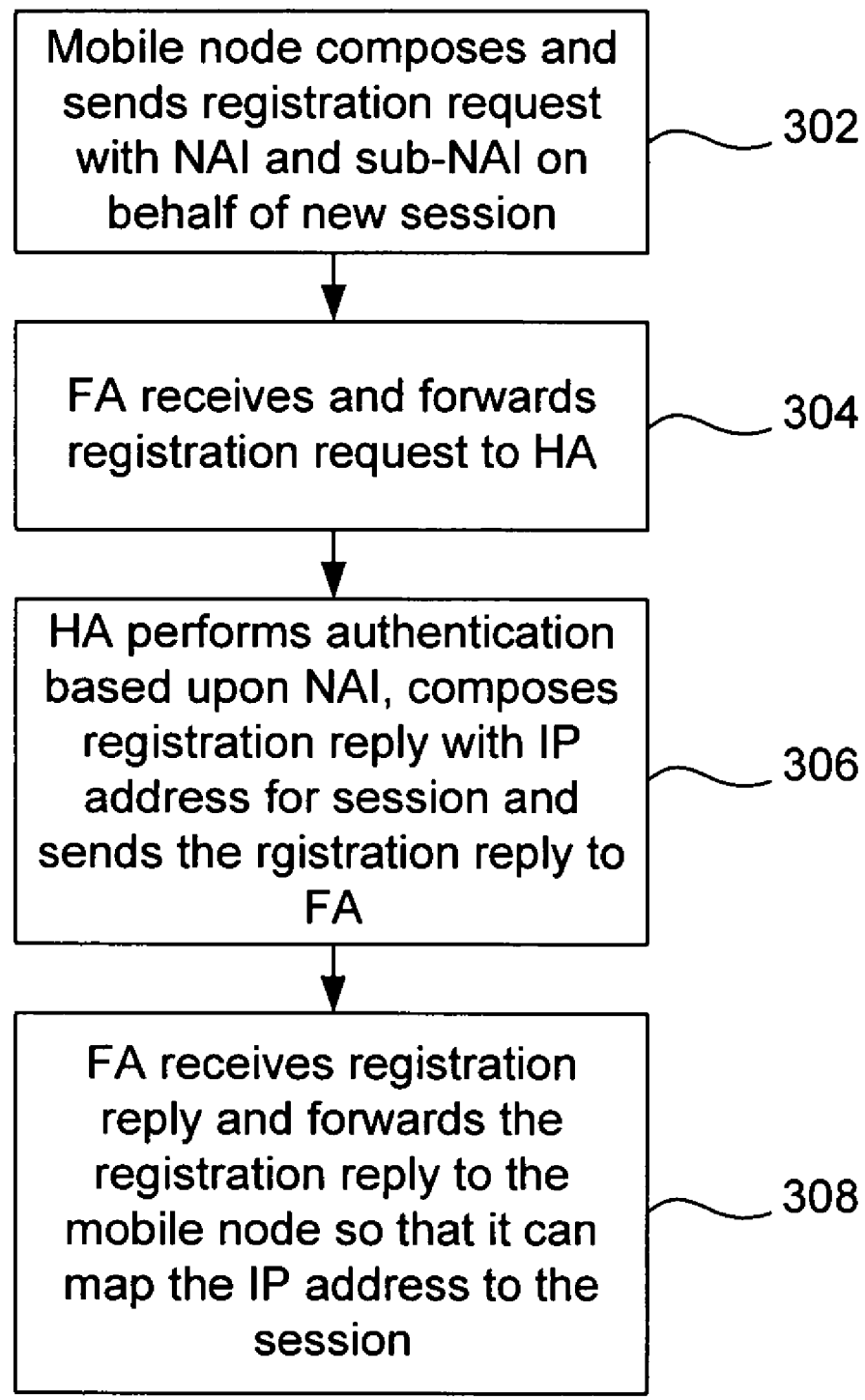
FIG. 3 is a process flow diagram illustrating the steps performed during registration on behalf of a new session in accordance with an embodiment of the invention.

FIG. 3 is a process flow diagram illustrating the steps performed during registration on behalf of a new session in accordance with an embodiment of the invention. As shown at block 302 the mobile node composes and sends a registration request including an NAI and a sub-NAI on behalf of a new session. In addition, the registration request specifies a care-of address of a Foreign Agent to which the session wishes to roam and a Home Agent address associated with the mobile node. The Foreign Agent receives the registration request and forwards the registration request to the Home Agent at block 304. The Home Agent performs authentication based upon the NAI, composes the registration reply with the IP address assigned to that session and sends the registration reply to the Foreign Agent at block 306. At block 308 the Foreign Agent receives the registration reply and forwards the registration reply to the mobile node so that it can map the IP address to the session. Accordingly, the mobile node may subsequently use the IP address to identify packets that are sent by that session as well as packets that are addressed to that session.

Figure 4:
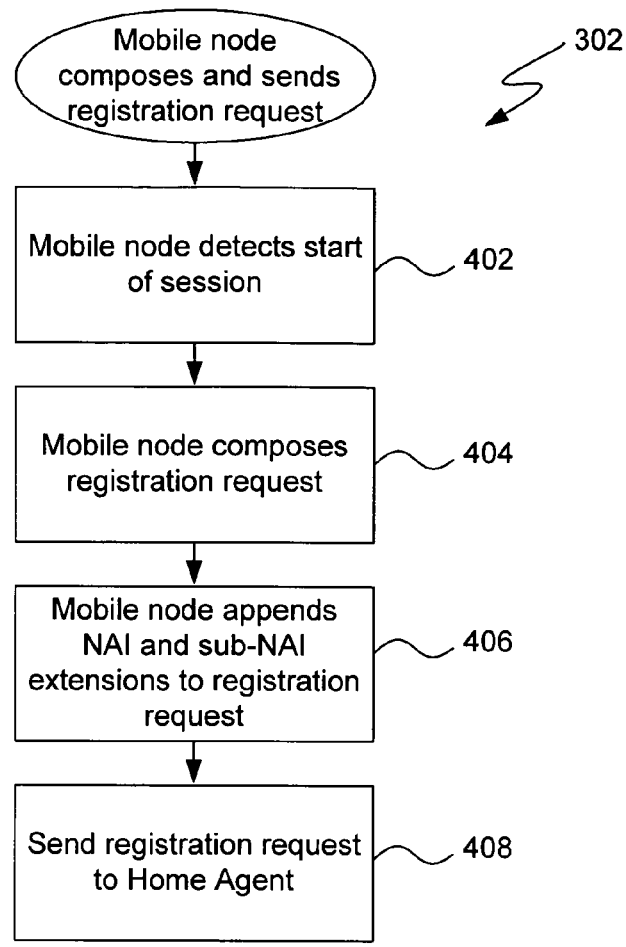
FIG. 4 is a process flow diagram illustrating the steps performed during registration by a mobile node in accordance with an embodiment of the invention.

As shown at block 302 of FIG. 3, the mobile node is responsible for composing and sending a registration request on behalf of a new session (e.g., device or application). FIG. 4 is a process flow diagram illustrating the steps performed during registration by a mobile node on behalf of a session in accordance with an embodiment of the invention. When the mobile node detects the start of a new session (e.g., application or device) at block 402, the mobile node composes a registration request at block 404. As described in RFC 2002, the registration request must identify the Home Agent associated with the mobile node. In addition, in order to enable the Home Agent to uniquely assign an IP address to the session, a NAI and sub-NAI are specified. More particularly, in accordance with one embodiment, the NAI and sub-NAI are each provided in a separate extension to the registration request. Thus, at block 406, the mobile node appends separate NAI and sub-NAI extensions to the registration request. The NAI extension includes a NAI identifying a userID submitted (e.g., during PPP authentication) while the sub-NAI uniquely identifies a session associated with the NAI. The registration request is then sent at block 408.

Figure 5:
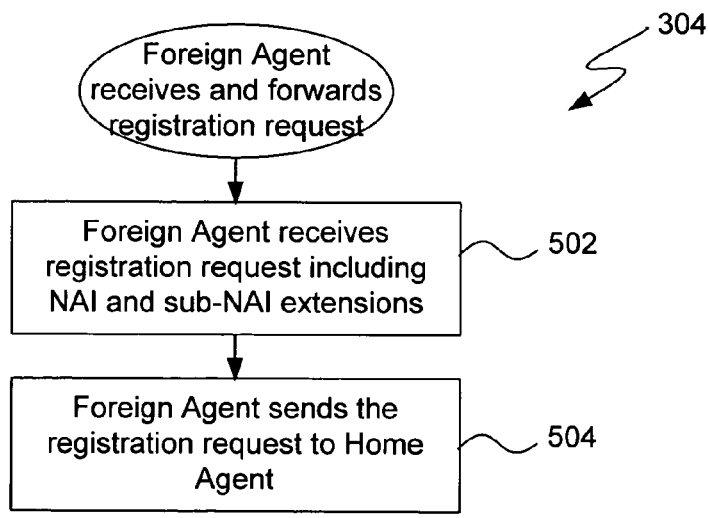
FIG. 5 is a process flow diagram illustrating the steps performed during registration by a Foreign Agent to process a registration request in accordance with an embodiment of the invention.

As described above with reference to block 304 of FIG. 3, the Foreign Agent is responsible for receiving and forwarding the registration request. FIG. 5 is a process flow diagram illustrating the steps performed during registration by a Foreign Agent to process a registration request in accordance with an embodiment of the invention. As shown at block 502, the Foreign Agent receives the registration request including the NAI and sub-NAI extensions and forwards the registration request to the Home Agent identified by the Home Agent address at block 504.

Figure 6:
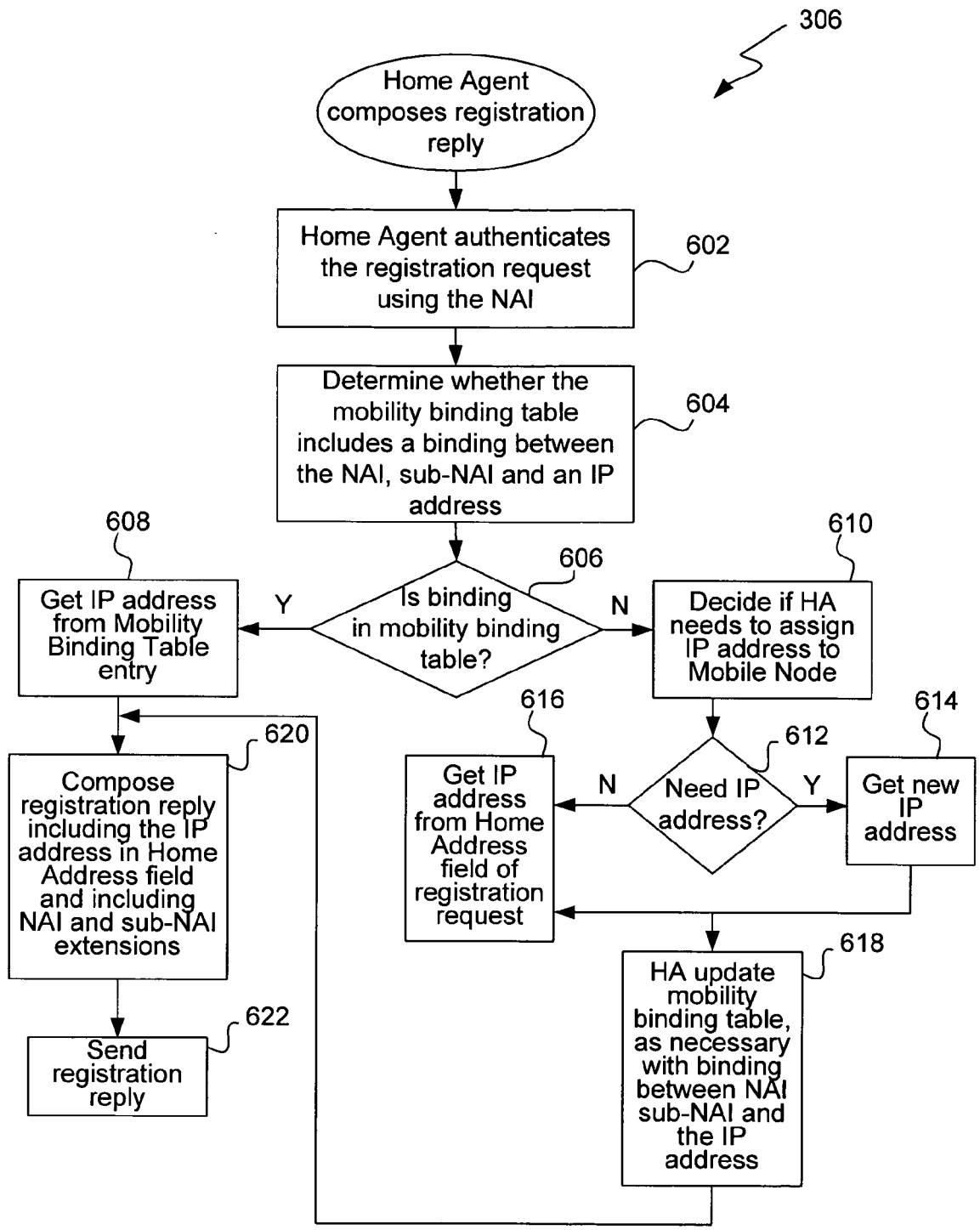
FIG. 6 is a process flow diagram illustrating the steps performed during registration by a Home Agent in accordance with an embodiment of the invention.

Once the Home Agent receives the registration request including the NAI and the sub-NAI identifying a session associated with the NAI, it composes a registration reply as described above with reference to block 306 of FIG. 3. FIG. 6 is a process flow diagram illustrating the steps performed during registration by a Home Agent in accordance with an embodiment of the invention. First, the Home Agent authenticates the mobile node. For instance, authentication may be performed using the NAI obtained from the registration request at block 602.

Upon completion of authentication of the mobile node performing the proxy registration on behalf of the associated session, the Home Agent composes and sends a registration reply. In order to provide an IP address for the session, the Home Agent determines whether a binding already exists between the NAI, sub-NAI and an IP address in a mobility binding table associated with the Home Agent at block 604. At block 606, if there is a binding in the mobility binding table for the NAI, sub-NAI and an IP address, this IP address is obtained from the mobility binding table at block 608. Otherwise, the Home Agent decides whether it needs to assign an IP address to the mobile node for this particular session at block 610. For instance, an indicator may be set in the registration request or a specific indicator may be placed in the Home Address field of the registration request. If the Home Agent determines at block 612 that a new IP address is needed, a new IP address is obtained at block 614. Otherwise, the IP address from the Home Address field of the registration request is obtained at block 616. The Home Agent then updates the mobility binding table as necessary with a binding between the NAI, the sub-NAI and the IP address at block 618.

After the IP address for the mobile node is obtained, the registration reply is composed at block 620. More particularly, as described above, the Home Address field of the registration reply includes the IP address. In addition, the NAI and the sub-NAI are included in the registration reply. For instance, as described above with reference to the registration request, the NAI and sub-NAI may be provided in separate extensions to the registration reply. The Home Agent then sends the registration reply at block 622.

Figure 7:
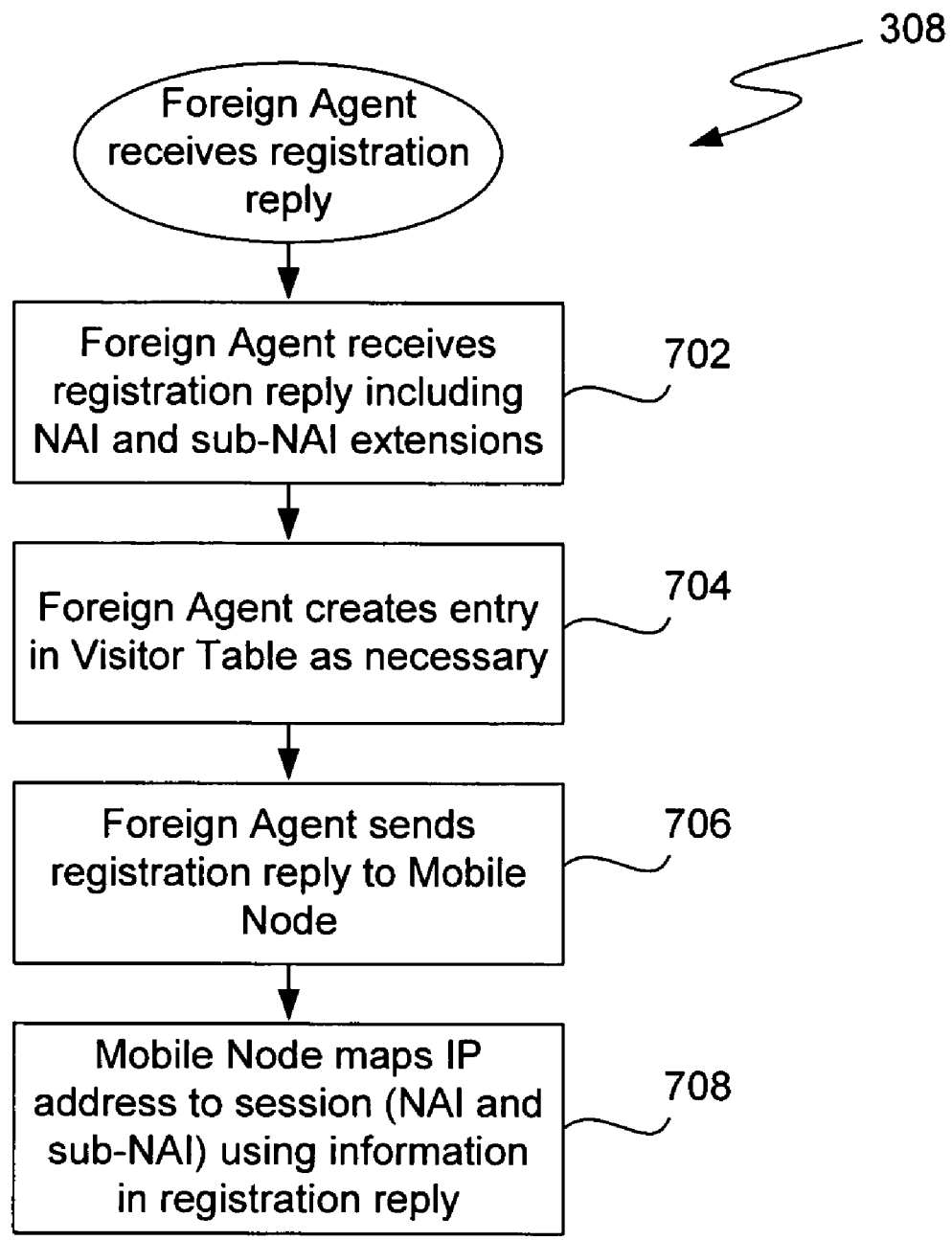
FIG. 7 is a process flow diagram illustrating the steps performed by the Foreign Agent to process a registration reply in accordance with an embodiment of the invention.

When the Foreign Agent receives the registration reply, it updates its tables and forwards the reply to the mobile node performing the proxy registration. FIG. 7 is a process flow diagram illustrating the steps performed by the Foreign Agent to process a registration reply in accordance with an embodiment of the invention. As shown at block 702, the Foreign Agent receives the registration reply including the NAI and sub-NAI information. The Foreign Agent then updates its visitor table as necessary with a mapping of the NAI, the sub-NAI and the IP address associated with the mobile node at block 704. The Foreign Agent then sends the registration reply to the mobile node at block 706. The mobile node then maps the IP address for the session to the session information at block 708. More particularly, the mobile node maps the IP address to the NAI and sub-NAI obtained from the registration reply. As described above, the NAI and the sub-NAI may be obtained from one or more extensions to the registration reply. Once the mobile node has mapped this session information to the IP address, the mobile node may subsequently forward packets to the appropriate session (e.g., application or device) using this information. Accordingly, the mobile node may have multiple associated IP addresses.

As described above with reference to FIG. 4, the mobile node composes a registration request on behalf of an application or device. FIG. 8 is a diagram illustrating an exemplary registration request that may be sent by a mobile node in accordance with an embodiment of the invention. As shown, the registration request 802 includes a NAI extension 804 including a NAI and a sub-NAI extension 806 including a sub-NAI. The sub-NAI may be provided in the registration request 802 by the mobile node. Alternatively, the sub-NAI may be provided in the registration request 802 by the Foreign Agent during registration.

Similarly, when authentication is completed, a registration reply is sent by the Home Agent to the mobile node. FIG. 9 is a diagram illustrating an exemplary registration reply that may be sent by a Home Agent in accordance with an embodiment of the invention. As shown, the registration reply 902 includes a NAI extension 904 including a NAI and a sub-NAI extension 906 including a sub-NAI. Although the NAI and sub-NAI are provided in separate extensions to the registration request and registration reply, this information may be provided in an alternate manner. For instance, this information may be provided in the registration request and/or reply packets in unused fields or, alternatively, may be provided in a single extension.

During the registration process, the Home Agent may need to update its mobility binding table as shown at block 618 of FIG. 6. When the Home Agent updates an associated mobility binding table, the IP address associated with that session is mapped to session information for that session. FIG. 10 is a diagram illustrating an exemplary mobility binding table that may be used by an active Home Agent in accordance with an embodiment of the invention. The mobility binding table includes a NAI 1002, a sub-NAI 1004, and an IP address 1006 associated with that session. From this information, the Home Agent may determine during the registration process whether a binding exists between a NAI, a sub-NAI and an IP address. Moreover, the entry for this session is associated with a care-of address 1008 (e.g., foreign agent address) and a tunnel interface 1010. In addition, the mobility binding table may include other information such as the lifetime of the particular session. In this manner, the Home Agent may identify the session that has registered with the Home Agent via the mobile node. Moreover, the mobility binding table may include care-of address associations for additional nodes that do not implement the Mobile IP protocol (and other mobile nodes implementing the Mobile IP protocol) based with the same Home Agent. Such additional nodes may be linked to the Foreign Agent or any other Foreign Agent that has registered a Mobile IP connection.

As described above with reference to block 704 of FIG. 7, the Foreign Agent may update its visitor table to identify those sessions that have roamed to the Foreign Agent. FIG. 11 is a diagram illustrating an exemplary visitor table that may be used by an active Foreign Agent in accordance with an embodiment of the invention. As shown, the NAI 1102 and sub-NAI 1104 are mapped to the IP address 1106 that identifies this particular session. From this information, the Foreign Agent may monitor and limit the number of registration requests a particular user sends out. In addition, the visitor table includes an IP address of the Home Agent 1108 and a corresponding interface 1110. More particularly, the session is associated with the interface and its Home Agent through specifying a tunnel to the Home Agent. Accordingly, through the visitor table, the Foreign Agent may route data packets to the session via the assigned IP address.

Once the registration phase has been completed, the mobile node may use the assigned IP address on behalf of a session in its communication with corresponding nodes. These corresponding nodes may then send packets to this assigned IP address. The Home Agent then forwards these packets to the appropriate Foreign Agent using its mobility binding table. Since the Foreign Agent has access to the IP address in its visitor table, these packets may be forwarded to the mobile node associated with the assigned IP address. The IP address may be de-allocated at a later time to permit the IP address to be reassigned to another mobile node. Thus, as the mobile node roams from foreign agent to foreign agent, the mobile node may keep the IP address for a particular session from the first registration until it is de-allocated. This permits corresponding nodes to continue using the same IP address to communicate with the session (e.g., application or device) via the mobile node. Thus, through proxy registration by a mobile node on behalf of an associated session (e.g., device or application), multiple users may roam the Internet via the mobile node. Thus, multiple devices may be simultaneously connected to the mobile node in order to enable mobility in these devices. Accordingly, through such "proxy" registration, nodes that do not have Mobile IP software, hardware and/or firmware may be provided Mobile IP functionality.

The apparatus (Home Agent, Foreign Agent, and/or node) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Generally, the registration technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the registration systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Referring now FIG. 12, a router 1310 suitable for implementing the present invention includes a master central processing unit (CPU) 1362, interfaces 1368, and a bus 1315 (e.g., a PCI bus). When acting under the control of appropriate software or firmware, the CPU 1362 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1362 may include one or more processors 1363 such as a processor from the Motorola family of microprocessors or the MIPS family of microprocessors. In an alternative embodiment, processor 1363 is specially designed hardware for controlling the operations of router 1310. In a specific embodiment, a memory 1361 (such as non-volatile RAM and/or ROM) also forms part of CPU 1362. However, there are many different ways in which memory could be coupled to the system.

The interfaces 1368 are typically provided as interface cards (sometimes referred to as "line cards"). Generally, they control the sending and receiving of data packets over the network and sometimes support other peripherals used with the router 1310. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1362 to efficiently perform routing computations, network diagnostics, security functions, etc.

Although the system shown in FIG. 12 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1361) configured to store program instructions for the general-purpose network operations and mechanisms for registration and routing functions described herein. The program instructions may control the operation of an operating system and/or one or more applications, for example. The memory or memories may also be configured to store tables such as mobility binding and visitor tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For example, although the NAI has been described as a userID submitted during PPP authentication, the NAI may be any identifier that is used to identify a mobile node. More particularly, the NAI may be used to identify a mobile node that needs a home address. In addition, although the specification has described routers, other entities used to tunnel packets to mobile nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. In a Foreign Agent, a method of processing a registration request, comprising:
   receiving a registration request identifying a Home Agent associated with the mobile node, the registration request further including a NAI extension including a NAI associated with the mobile node;
   providing a sub-NAI in a sub-NAI extension to the registration request, the sub-NAI uniquely identifying a session associated with the mobile node; and
   sending the registration request to the Home Agent associated with the mobile node.

2. In a mobile node, a method of sending a registration request, comprising:
   composing a registration request identifying a Home Agent associated with the mobile node;

appending a NAI extension including a NAI associated with the mobile node to the registration request;

appending a sub-NAI extension including a sub-NAI that uniquely identifies a session associated with the mobile node to the registration request; and sending the registration request.

3. The method as recited in claim 2, wherein the NAI identifies a userID submitted during PPP authentication.

4. The method as recited in claim 2, wherein the NAI is an identifier submitted for authentication of the mobile node.

5. The method as recited in claim 2, wherein the NAI is an e-mail address or a userID submitted in an application layer authentication.

6. The method as recited in claim 2, further comprising:
detecting the session;
wherein composing the registration request is performed in response to the detection of the session.

7. The method as recited in claim 2, wherein the session is associated with a device that is separate from the mobile node.

8. The method as recited in claim 2, wherein the session is associated with an application running on the mobile node.

9. The method as recited in claim 2, further comprising:
receiving a registration reply including an IP address associated with the session and identifying the NAI and the sub-NAI; and
mapping the NAI and the sub-NAI to the IP address associated with the session.

10. The method as recited in claim 9, wherein the registration reply includes a NAI extension including the NAI and a sub-NAI extension including the sub-NAI.

11. In a Foreign Agent, a method of registering a session with a Home Agent, the method comprising:
receiving a registration request identifying a Home Agent associated with the mobile node, the registration request further including a NAI extension including a NAI and a sub-NAI extension including a sub-NAI that uniquely identifies a session associated with the NAI; and
sending the registration request to the Home Agent.

12. The method as recited in claim 11, wherein the NAI is a userID submitted during PPP authentication.

13. The method as recited in claim 11, wherein the NAI is an identifier submitted for authentication of the mobile node.

14. The method as recited in claim 11, wherein the NAI is an e-mail address or a userID submitted in an application layer authentication.

15. The method as recited in claim 11, wherein the session is associated with a device that is separate from the mobile node.

16. The method as recited in claim 11, wherein the session is associated with an application running on the mobile node.

17. In a Home Agent, a method of registering a session associated with a mobile node, comprising:
receiving a registration request, the registration request including a NAI extension including a NAI identifying a mobile node and a sub-NAI extension including a sub-NAI that uniquely identifies a session associated with the NAI;
authenticating the mobile node using the NAI;
composing a registration reply;
appending a NAI extension to the registration reply, the NAI extension including the NAI identifying the mobile node; and appending a sub-NAI extension to the registration reply, the sub-NAI extension including the sub-NAI that uniquely identifies the session associated with the NAI.

18. The method as recited in claim 17, wherein the NAI is a userID submitted during PPP authentication.

19. The method as recited in claim 17, wherein the session is associated with a device that is separate from the mobile node.

20. The method as recited in claim 17, wherein the session is associated with an application running on the mobile node.

21. In a Home Agent, a method of registering a session associated with a mobile node, comprising:
receiving a registration request, the registration request including a NAI extension including a NAI and a sub-NAI extension including a sub-NAI that uniquely identifies a session associated with the NAI;
obtaining an IP address associated with the session;
composing a registration reply including the IP address;
appending a NAI extension to the registration reply the NAI extension including the NAI;
appending a sub-NAI extension to the registration reply, the sub-NAI extension including the sub-NAI that uniquely identifies the session associated with the NAI; and
sending the registration reply.

22. The method as recited in claim 21, wherein the NAI identifies a userID submitted during PPP authentication.

23. The method as recited in claim 21, wherein composing the registration reply comprises:
providing the IP address in a Home Address field of the registration reply.

24. The method as recited in claim 21, wherein the session is associated with a device that is separate from the mobile node.

25. The method as recited in claim 21, wherein the session is associated with an application running on the mobile node.

26. The method as recited in claim 21, wherein obtaining the IP address for the mobile node comprises:
determining whether a mobility binding table associated with the Home Agent includes a binding between the NAI, the sub-NAI and an IP address;
when it is determined that the mobility binding table associated with the Home Agent includes a binding between the NAI, the sub-NAI and an IP address, obtaining the IP address from the mobility binding table.

27. The method as recited in claim 26, wherein obtaining the IP address for the mobile node further comprises:
when it is determined that the mobility binding table associated with the Home Agent does not include a binding between the NAI, the sub-NAI and an IP address, obtaining a new IP address.

28. The method as recited in claim 26, wherein obtaining the IP address for the mobile node further comprises:
when it is determined that the mobility binding table associated with the Home Agent does not include a binding between the NAI, the sub-NAI and an IP address, obtaining an IP address from a Home Address field of the registration request.

29. The method as recited in claim 26, further comprising:
when it is determined that the mobility binding table associated with the Home Agent does not include a binding between the NAI, the sub-NAI and an IP address, updating the mobility binding table associated with the Home Agent with an entry mapping the NAI and the sub-NAI to an IP address associated with the mobile node.

30. In a Foreign Agent, a method of processing a registration reply packet received from a mobile node, comprising:
receiving a registration reply including an IP address associated with the mobile node, a NAI extension including a NAI and a sub-NAI extension including a sub-NAI that uniquely identifies a session associated with the NAI;
updating a visitor table with a mapping of the NAI, the sub-NAI, and the IP address associated with the mobile node; and
sending the registration reply to the mobile node.

31. The method as recited in claim 30, wherein the NAI identifies a userID submitted during PPP authentication.

32. The method as recited in claim 30, wherein the session is associated with a device that is separate from the mobile node.

33. The method as recited in claim 30, wherein the session is associated with an application running on the mobile node.

34. A computer-readable medium for processing a registration request in a Foreign Agent, comprising:
instructions for receiving a registration request identifying a Home Agent associated with the mobile node, the registration request further including a NAI extension including a NAI associated with the mobile node;
instructions for providing a sub-NAI in a sub-NAI extension to the registration request, the sub-NAI uniquely identifying a session associated with the mobile node; and
instructions for sending the registration request to the Home Agent associated with the mobile node.

35. A Foreign Agent adapted for registering a session with a Home Agent, comprising:
a processor; and
a memory, the memory storing therein:
instructions for receiving a registration request identifying a Home Agent associated with the mobile node, the registration request further including a NAI extension including a NAI and a sub-NAI extension including a sub-NAI that uniquely identifies a session associated with the NAI; and
instructions for sending the registration request to the Home Agent.

36. A computer-readable medium for registering a session associated with a mobile node in a Home Agent, comprising:
instructions for receiving a registration request, the registration request including a NAI extension including a NAI identifying a mobile node and a sub-NAI extension including a sub-NAI that uniquely identifies a session associated with the NAI;
instructions for authenticating the mobile node using the NAI; and
instructions for composing a registration reply including a NAI extension including the NAI identifying the mobile node and a sub-NAI extension including the sub-NAI that uniquely identifies the session associated with the NAI.

37. A Home Agent configured for registering a session associated with a mobile node, comprising:
a processor; and
a memory, the memory storing therein:
instructions for receiving a registration request, the registration request including a NAE extension including a NAI and a sub-NAI extension including a sub-NAI that uniquely identifies a session associated with the NAI;
instructions for obtaining an IP address associated with the session;
instructions for composing a registration reply including the IP address, a NAI extension including the NAI and a sub-NAI extension including the sub-NAI that uniquely identifies the session associated with the NAI; and
instructions for sending the registration reply.

38. A Foreign Agent adapted for processing a registration request, comprising:
a processor; and
a memory, at least one of the processor and the memory being adapted for:
receiving a registration request identifying a Home Agent associated with the mobile node, the registration request further including a NAI extension including a NAI associated with the mobile node;
providing a sub-NAI in sub-NAI extension to the registration request, the sub-NAI uniquely identifying a session associated with the mobile node; and
sending the registration request to the Home Agent associated with the mobile node.

39. A Foreign Agent adapted for processing a registration request, comprising:
means for receiving a registration request identifying a Home Agent associated with the mobile node, the registration request further including a NAI extension including a NAI associated with the mobile node;
means for providing a sub-NAI in sub-NAI extension to the registration request, the sub-NAI uniquely identifying a session associated with the mobile node; and
means for sending the registration request to the Home Agent associated with the mobile node.

40. A computer-readable medium storing thereon computer-readable instructions for sending a registration request in a mobile node, comprising:
instructions for composing a registration request identifying a Home Agent associated with the mobile node;
instructions for appending a NAI extension including a NAI associated with the mobile node to the registration request;
instructions for appending a sub-NAI extension including a sub-NAI that uniquely identifies a session associated with the mobile node to the registration request; and
instructions for sending the registration request.

41. A mobile node adapted for sending a registration request, comprising:
a processor; and
a memory, at least one of the processor and the memory being adapted for:
composing a registration request identifying a Home Agent associated with the mobile node;
appending a NAI extension including a NAI associated with the mobile node to the registration request;
appending a sub-NAI extension including a sub-NAI that uniquely identifies a session associated with the mobile node to the registration request; and
sending the registration request.

42. A mobile node adapted for sending a registration request, comprising:
means for composing a registration request identifying a Home Agent associated with the mobile node;
means for appending a NAI extension including a NAI associated with the mobile node to the registration request;

means for appending a sub-NAI extension including a sub-NAI that uniquely identifies a session associated with the mobile node to the registration request; and means for sending the registration request.

43. A computer-readable medium storing thereon computer-readable instructions for registering a session with a Home Agent in a Foreign Agent, comprising:

instructions for receiving a registration request identifying a Home Agent associated with the mobile node, the registration request further including a NAI extension including a NAI and a sub-NAI extension including a sub-NAI that uniquely identifies a session associated with the NAI; and instructions for sending the registration request to the Home Agent.

44. A Foreign Agent adapted for registering a session with a Home Agent, comprising:

means for receiving a registration request identifying a Home Agent associated with the mobile node, the registration request further including a NAI extension including a NAI and a sub-NAI extension including a sub-NAI that uniquely identifies a session associated with the NAI; and means for sending the registration request to the Home Agent.

45. A Home Agent adapted for registering a session associated with a mobile node, comprising:

a processor; and a memory, at least one of the processor and the memory being adapted for:

receiving a registration request, the registration request including a NAI extension including a NAI identifying a mobile node and a sub-NAI extension including a sub-NAI that uniquely identifies a session associated with the NAI;

authenticating the mobile node using the NAI;

composing a registration reply;

appending a NAI extension to the registration reply, the NAI extension including the NAI identifying the mobile node; and appending a sub-NAI extension to the registration reply, the sub-NAI extension including the sub-NAI that uniquely identifies the session associated with the NAI.

46. A Home Agent adapted for registering a session associated with a mobile node, comprising:

means for receiving a registration request, the registration request including a NAI extension including a NAI identifying a mobile node and a sub-NAI extension including a sub-NAI that uniquely identifies a session associated with the NAI;

means for authenticating the mobile node using the NAI;

means for composing a registration reply;

means for appending a NAI extension to the registration reply, the NAI extension including the NAI identifying the mobile node; and means for appending a sub-NAI extension to the registration reply the sub-NAI extension including the sub-NAI that uniquely identifies the session associated with the NAI.

47. A computer-readable medium storing thereon computer-readable instructions for registering a session associated with a mobile node in a Home Agent, comprising:

instructions for receiving a registration request, the registration request including a NAI extension including a NAI and a sub-NAI extension including a sub-NAI that uniquely identifies a session associated with the NAI;

instructions for obtaining an IP address associated with the session;

instructions for composing a registration reply including the IP address;

appending a NAI extension to the registration reply the NAI extension including the NAI;

appending a sub-NAI extension to the registration reply, the sub-NAI extension including the sub-NAI that uniquely identifies the session associated with the NAI; and instructions for sending the registration reply.

48. A Home Agent adapted for registering a session associated with a mobile node, comprising:

means for receiving a registration request, the registration request including a Nai extension including a NAI and a sub-NAI extension including a sub-NAI that uniquely identifies a session associated with the NAI;

means for obtaining an IP address associated with the session;

means for composing a registration reply including the IP address;

appending a NAI extension to the registration reply, the NAI extension including the NAI;

appending a sub-NAI extension to the registration reply, the sub-NAI extension including the sub-NAI that uniquely identifies the session associated with the NAI; and means for sending the registration reply.

49. A computer-readable medium storing thereon computer-readable instructions for processing a registration reply packet received from a mobile node in a Foreign Agent, comprising:

instructions for receiving a registration reply including an IP address associated with the mobile node, a NAI extension including a NAI and a sub-NAI extension including a sub-NAI that uniquely identifies a session associated with the NAI;

instructions for updating a visitor table with a mapping of the NAI, the sub-NAI, and the IP address associated with the mobile node; and instructions for sending the registration reply to the mobile node.

50. A Foreign Agent adapted for processing a registration reply packet received from a mobile node, comprising:

a processor; and a memory, at least one of the processor and the memory being adapted for:

receiving a registration reply including an IP address associated with the mobile node, a NAI extension including a NAI and a sub-NAI extension including a sub-NAI that uniquely identifies a session associated with the NAI;

updating a visitor table with a mapping of the NAI, the sub-NAI, and the IP address associated with the mobile node; and sending the registration reply to the mobile node.

51. A Foreign Agent adapted for processing a registration reply packet received from a mobile node, comprising:

means for receiving a registration reply including an IP address associated with the mobile node, a NAI extension including a NAI and a sub-NAI extension including a sub-NAI that uniquely identifies a session associated with the NAI;

means for updating a visitor table with a mapping of the NAI, the sub-NAI, and the IP address associated with the mobile node; and means for sending the registration reply to the mobile node.

* * * * *